United States Patent [19]

Schmidt

[11] Patent Number: 5,801,329
[45] Date of Patent: Sep. 1, 1998

[54] OUTDOOR POWER LINE HAVING A DAMPING DEVICE

[75] Inventor: Johannes Schmidt, Schwabach, Germany

[73] Assignee: Richard Bergner GmbH & Co., Schwabach, Germany

[21] Appl. No.: 179,990

[22] Filed: Jan. 10, 1994

[30] Foreign Application Priority Data

Jan. 13, 1993 [DE] Germany .................... 43 00 657.4

[51] Int. Cl.$^6$ ............................................ H02G 7/14
[52] U.S. Cl. ......................................................... 174/42
[58] Field of Search ........................ 174/42, 40 R, 174/45 R, 45 TD, 146

[56] References Cited

U.S. PATENT DOCUMENTS

| | | | |
|---|---|---|---|
| 2,215,541 | 9/1940 | Buchanan et al. | 174/42 |
| 3,246,073 | 4/1966 | Bouche et al. | 174/42 |
| 3,941,914 | 3/1976 | Oishi et al. | 174/42 |

FOREIGN PATENT DOCUMENTS

| | | | |
|---|---|---|---|
| 0033223 | 8/1981 | European Pat. Off. | |
| 769737 | 8/1934 | France. | |
| 550170 | 3/1930 | Germany. | |
| 551442 | 5/1932 | Germany. | |
| 565334 | 11/1932 | Germany. | |
| 1303538 | 2/1972 | Germany. | |
| 2942621A1 | 4/1981 | Germany. | |
| 3501757 | 7/1986 | Germany | 174/42 |

OTHER PUBLICATIONS

Lutar Möcks, "Damping of Stranded Conductor Vibration in High Voltage Power Transmission Lines" 1981, p. 5.
Rudolf Buchwald, "Conductor Vibrations, Easy to Understand" 1969, p. 30.
Richard Bergner Schwabach, "General Information Concerning the Vibrating of Stranded Conductors", 1 page.
G.R. Carson, "345–kv lime features guyed delta towers", Electrical World, Sep. 22, 1969, pp. 34–36.
Reynolds, "It takes all kinds.", Electrical World Apr. 28, 1969 pp. 6–7.

*Primary Examiner*—Hyung S. Sough
*Attorney, Agent, or Firm*—Spencer & Frank

[57] ABSTRACT

A high voltage outdoor power line includes at least one stranded conductor, and at least one damping device for damping mechanical Karman vibrations of the stranded conductor. The damping device includes a plurality of vibration dampers mounted on the stranded conductor by being suspended from respective suspension points on the stranded conductor, a spacing between the suspension points of two directly adjacent vibration dampers in a mounted state being smaller than half of a smallest anticipated wavelength of the Karman vibrations.

6 Claims, 1 Drawing Sheet

OUTDOOR POWER LINE HAVING A DAMPING DEVICE

CROSS-REFERENCE TO RELATED APPLICATION

This application claims the priority of Application P 4300657.4 filed in Germany on Jan. 13, 1993, the content of which is incorporated herein by reference.

BACKGROUND OF THE INVENTION

Wind causes the stranded conductors of high-voltage outdoor power lines to vibrate mechanically. These vibrations are short-wave vibrations, also known as Karman vibrations, and can have frequencies between 5 Hz and 50 Hz. The vibrations cause a dynamic reversed bending stress in the stranded conductor. Support clamps or anchoring clamps, in which the stranded conductor is secured, are disposed on pylons. In the region of the supports, the stranded conductor behaves as if it were tightly clamped. In this region the stranded conductor is subjected to static tensile stress and bending stress. Dynamic and static stresses can lead to damage or even destruction of the stranded conductor.

To protect the stranded conductor against reversed bending stress, damping devices are mounted on the stranded conductor. They are attached to the stranded conductor, near the support clamps, as is known from German Patent 565,334. The damping device, essentially comprising a single vibration damper, is therefore simple to mount from the pylon, specifically the cross arm of the pylon. The support clamp or anchoring clamp acts as a vibration node, and serves as a point of reference when the damping device is mounted. From this reference point the vibration damper can easily be mounted on the stranded conductor at a previously calculated distance, so that the damper is not located in the vibration node of a mechanical vibration. The damping effect of the vibration damper is always a function of the distance from the reference point.

With a greater span length of the stranded conductor, defined by the spacing of two pylons, the two damping devices mounted in the region of the stranded conductor located near the pylons do not have a sufficient damping effect on mechanical vibrations over the entire stranded conductor. Instead, the damping device only damps the mechanical vibrations of a specific length of the stranded conductor. Therefore, for greater span lengths, at least one additional damping device must be mounted in a central region of the stranded conductor. However, no reference point is provided in this central region. Hence, the danger is great that the single vibration damper of the damping device will be mounted in a vibration node of the stranded conductor. Unfortunately, the damping effect of the vibration damper is ineffective in the vibration node.

The same problem arises when damping devices are mounted from a helicopter. The damping device cannot be mounted near the pylon, because the danger is too great there that the helicopter will collide with the pylon. Therefore, when mounted with a helicopter, the damping device is mounted to the stranded conductor in a region remote from the pylon. However, as already explained, no reference point is provided there for mounting. It is thus no longer assured that the device will be protected against vibration at all occurring vibration frequencies.

SUMMARY OF THE INVENTION

The object of the present invention is to avoid the above drawbacks and assure the damping effect of the damping device, regardless of its mounting position on the stranded conductor. This object is attained by providing the power line with damping devices that can be mounted to the stranded conductors of the power line to damp the mechanical vibrations of the stranded conductor.

In accordance with the present invention, the damping device has at least two vibration dampers, and the spacing between two consecutive vibration dampers when they are mounted on the power line is smaller than half of the smallest anticipated wavelength of the mechanical Karman vibration, that is to say the distance a between two consecutive vibration dampers is $$a < \lambda_{min}/2.$$

In accordance with this formula, spacing a between two vibration dampers is selected such that, even with the smallest anticipated wavelength $\lambda_{min}$, it never occurs that all of the vibration dampers are simultaneously secured in a vibration node. This arrangement of at least two vibration dampers replaces the vibration damper conventionally used alone at a specific location of the stranded conductor, thus assuring the damping effect of the damping device, regardless of the distance from the pylon. Even in the case where a vibration damper is mounted in a vibration node, in the damping device of the invention, at least one additional vibration damper has a damping effect. The added costs of the additional vibration dampers of a damping device are minimal in comparison to repair costs and possible economic consequences of a conductor break caused by an ineffective damping device.

The damping device of the invention is independent of the structural embodiment and precise mode of function of the vibration dampers.

The damping effect of the damping device is assured with as few as two vibration dampers.

Depending on the degree of effectiveness, a single damping device or a plurality thereof may be provided between two pylons (span width or span length) for each stranded conductor.

The damping device may comprise at least three vibration dampers. In this case it can suffice to mount a single damping device for each stranded conductor, even with large span widths, to sufficiently damp mechanical vibrations. Because a maximum of one vibration damper of three can be in a vibration node because of spacing a, at least two vibration dampers are simultaneously active. This damping device thus has the effect of two conventional damping devices mounted separately at the two end regions of the stranded conductor and having a single vibration damper each. This embodiment of the damping device permits mounting solely in a single region of the span width. The vibration dampers needed to damp stranded conductor vibrations can be mounted adjacently on the stranded conductor in a simple manner. This saves additional mounting time.

A greater number of vibration dampers accordingly improves the damping effect of the damping device, because the vibration energy of the stranded conductor, which must be destroyed, is distributed onto a greater number of vibration dampers. Mounting efforts in this instance are insignificantly increased, because all of the vibration dampers are mounted in the same region of the stranded conductor, and together form a single damping device. In practice, a plurality of vibration damping devices can be provided to achieve a sufficient damping of mechanical vibrations, even for span lengths that span great distances.

Mounting a damping device at an end region is best suited for greater span lengths. One damping device is preferably mounted in each of the two end regions of the span length in order to sufficiently damp mechanical vibrations. The selection of the precise mounting position in the end region is, however, not a function of the distance from the pylon.

The damping device is suited for helicopter mounting. This permits convenient mounting of the damping devices when the open-circuit line is located in regions that are particularly difficult to reach. Because of the damping effect of the damping device, which is not a function of a specific mounting position on the stranded conductor, the helicopter can fly to an easily accessible region of the stranded conductor for mounting. The helicopter does not have to maintain a previously calculated distance from the pylon. Only the required safety margin between the helicopter and the stranded conductor is necessary, which further simplifies mounting.

Shutting down the power line, which is required for mounting, is often undesirable or impossible because of the economic significance of doing so. In the case of a live stranded conductor, the damping device can be easily mounted to the stranded conductor with the aid of the helicopter.

BRIEF DESCRIPTION OF THE DRAWING

The invention is described in detail by way of examples shown in the figures.

DETAILED DESCRIPTION OF THE PREFERRED EMBODIMENT

Figure 1:
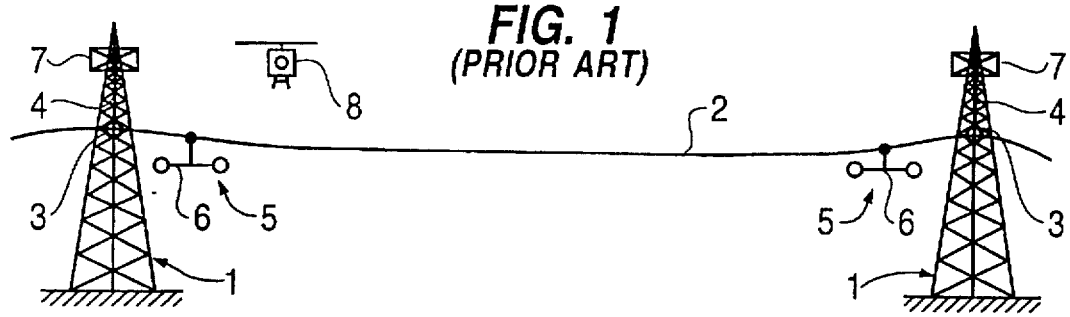
FIG. 1 is a schematic representation of a span with conventional damping devices

A stranded conductor 2 strung between two pylons 1 can be seen in FIG. 1. Support clamps 3, which are secured to pylons 1 by way of insulators 4, clamp stranded conductor 2. Support clamps 3 and insulators 4 are only shown schematically in FIG. 1. Two conventional damping devices 5 are mounted on stranded conductor 2. Each of the two damping devices 5 comprises a single vibration damper 6. Damping devices 5 are attached in end regions of stranded conductor 2, that is each region of stranded conductor 2 located near a pylon, because this mounting can easily be executed from pylon 1, specifically from a cross arm 7 connected to pylon 1.

Should a helicopter 8 be required for mounting damping devices 5, the damping device 5 must be mounted in a region of stranded conductor 2 that is remote from a pylon to avoid a collision of the helicopter rotor and pylon 1.

Figure 2:
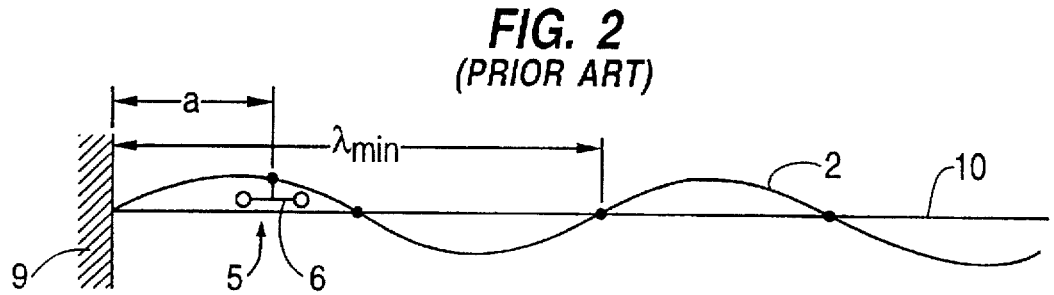
FIGS. 2 and 3 are fundamental representations of the stranded conductor with nodal points and vibration nodes, and a conventional damping device

Correct mounting of damping device 5, which comprises a single vibration damper 6, from pylon 1 is shown taking place in FIG. 2. Support clamp 3 is shown schematically as a secure clamp end 9. Vibration damper 6 is easily secured to stranded conductor 2 with a spacing a from clamp end 9. In this case spacing a is less than the half-wave of the smallest anticipated wavelength, $\lambda_{min}$. This reliably prevents damping device 5 from being secured in a vibration node.

Figure 3:
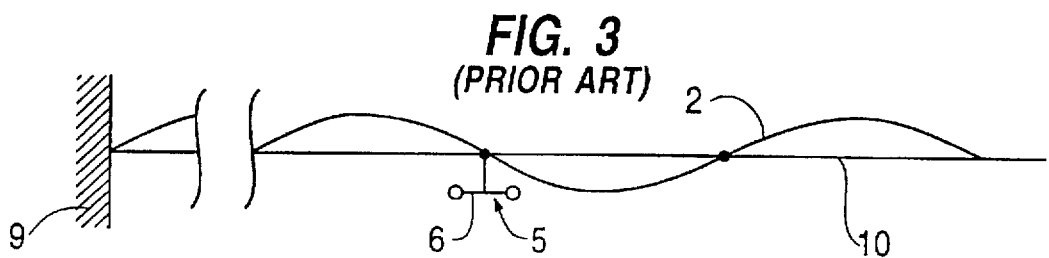

Because of the greater distance between clamp end 9 and the fastening location of damping device 5, it is very probable in helicopter-supported mounting that conventional damping device 5 will be secured in an occurring mechanical vibration (FIG. 3) and thus be ineffective.

Figure 4:
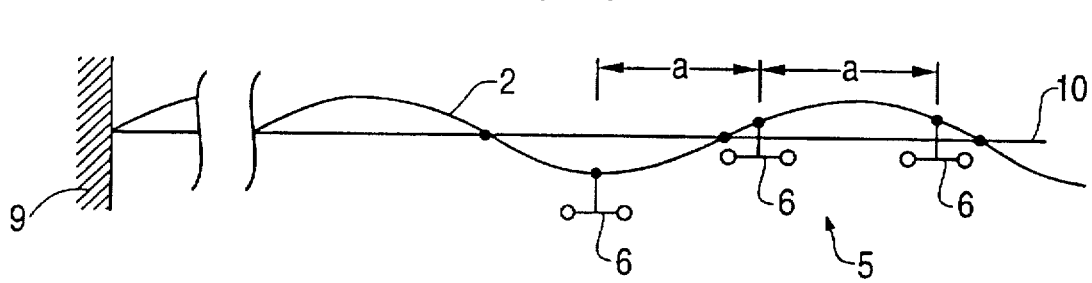
FIG. 4 is the representation of the stranded conductor of FIGS. 2 and 3, but with the damping device of the invention

In accordance with the invention, damping device 5 therefore comprises a plurality of vibration dampers 6. In the example of FIG. 4, three vibration dampers 6 are provided. Two consecutive vibration dampers 6 for each damping device 5 are secured to stranded conductor 2 with abovementioned spacing a spacing a extends parallel to the longitudinal axis 10 of non-displaced stranded conductor 2. If a vibration damper 6 is now in a vibration node of mechanical vibration, the respective other vibration damper (s) 6 of the same damping device is (are) reliably disposed outside a vibration node. The damping effect of the damping device 5 of the invention is thus assured at all anticipated frequencies of mechanical vibration of stranded conductor 2, regardless of the distance from clamp end 9.

As apparent from the foregoing description, each vibration damper is secured to stranded conductor 2 at a point on the conductor, that is, at a point with respect to the length of the conductor. Thus, a distance defined in relation to the damper is a distance measured to or from the point on the stranded conductor at which the damper is secured.

Figure 5:
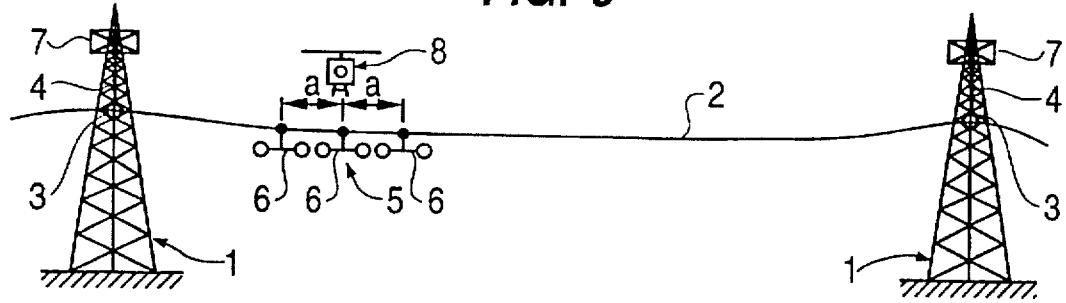
FIG. 5 is the representation of the span of FIG. 1, but with the damping device of the invention.

FIG. 5 shows damping device 5, which comprises three vibration dampers 6 and which is mounted from a helicopter 8. If a vibration damper 6 were to be in a vibration node, two vibration dampers 6 having a damping effect would be present. They have the same effect as the two vibration dampers conventionally secured at the two end regions of stranded conductor 2 (FIG. 1). Damping device 5 of the invention (FIG. 5) therefore replaces two conventional, separate damping devices 5 (FIG. 1) within specific segments of the span length. With the use of a single damping device 5 having three vibration dampers 6, the helicopter 8 need only fly to one region of stranded conductor 2, thus saving mounting time.

I claim:

1. A high voltage outdoor power line comprising at least one stranded conductor, and at least one damping device for damping mechanical Karman vibrations of the stranded conductor, the damping device including a plurality of vibration dampers mounted on the stranded conductor, each vibration damper being suspended from a corresponding suspension point on the stranded conductor, the spacing between the suspension points of two directly adjacent vibration dampers being smaller than half of a smallest anticipated wavelength of the Karman vibrations.

2. An outdoor power line as defined in claim 1, wherein said damping device is mounted at an end region of the stranded conductor.

3. The outdoor power line according to claim 1, wherein the plurality of vibration dampers comprise at least three vibration dampers.

4. The outdoor power line according to claim 1, wherein a plurality of damping devices are provided.

5. A method of damping mechanical Karman vibrations of at least one stranded conductor of a high voltage outdoor power line, the method comprising the steps of:

mounting at least one damping device including a plurality of vibration dampers on the stranded conductor by suspending each vibration damper from a corresponding suspension point on the stranded conductor; and setting a spacing between the suspension points of two directly adjacent vibrations dampers to be smaller than half of a smallest anticipated wavelength of the Karman vibrations.

6. The method according to claim 5, wherein the mounting step is performed by using a helicopter.

* * * * *